United States Patent
Jaishankar et al.

(10) Patent No.: US 11,434,416 B2
(45) Date of Patent: Sep. 6, 2022

(54) FORMATION OF IN-SITU ACTIVATED INJECTION FLUIDS FOR ENHANCED OIL RECOVERY APPLICATIONS

(71) Applicant: ExxonMobil Technology and Engineering Company, Annandale, NJ (US)

(72) Inventors: Aditya Jaishankar, Bridgewater, NJ (US); Aruna Mohan, Annandale, NJ (US); Mohsen S. Yeganeh, Hillsborough, NJ (US)

(73) Assignee: ExxonMobil Technology and Engineering Company, Annandale, NJ (US)

(*) Notice: Subject to any disclaimer, the term of this patent is extended or adjusted under 35 U.S.C. 154(b) by 0 days.

(21) Appl. No.: 16/385,713

(22) Filed: Apr. 16, 2019

(65) Prior Publication Data
US 2019/0322921 A1 Oct. 24, 2019

Related U.S. Application Data

(60) Provisional application No. 62/659,819, filed on Apr. 19, 2018.

(51) Int. Cl.
*C09K 8/584* (2006.01)
*C09K 8/588* (2006.01)

(52) U.S. Cl.
CPC .............. *C09K 8/588* (2013.01); *C09K 8/584* (2013.01); *C09K 2208/30* (2013.01)

(58) Field of Classification Search
CPC ..... C09K 8/588; C09K 8/584; C09K 2208/30
See application file for complete search history.

(56) References Cited

U.S. PATENT DOCUMENTS

| | | | |
|---|---|---|---|
| 4,432,881 A | 2/1984 | Evani | |
| 4,702,319 A | 10/1987 | Bock et al. | |
| 4,814,096 A * | 3/1989 | Evani | C09K 8/584 507/224 |
| 7,427,583 B2 | 9/2008 | Couillet et al. | |
| 2003/0204014 A1 * | 10/2003 | Yeung | C08F 290/06 524/558 |
| 2007/0281869 A1 * | 12/2007 | Drochon | C09K 8/88 507/219 |
| 2011/0053812 A1 * | 3/2011 | Ezell | C09K 8/68 507/219 |
| 2011/0281779 A1 * | 11/2011 | Weerasooriya | C07C 309/10 507/254 |
| 2018/0134943 A1 | 5/2018 | Jaishankar et al. | |
| 2018/0134944 A1 | 5/2018 | Jaishankar et al. | |

FOREIGN PATENT DOCUMENTS

FR 2781488 A1 * 1/2000 ................ C08J 3/05

OTHER PUBLICATIONS

Alami et al., "Interaction of Hydrophobically End-Capped Poly-(ethylene oxide) With Nonionic Surfactants in Aqueous Solution, Fluorescence and Light Scattering Studies", Macromolecules, 1986, vol. 29, pp. 5026-5035.
Cates et al., "Statistics and Dynamic of Worm-Like Surfactant Micelles", Journal of Physics: Condensed Matter, 1990, vol. 2, pp. 6870-6893.
Moitzi et al., "Viscoelastic Wormlike Micellar Solutions Made from Nonionic Surfactants: Structural Investigation by SANS and DLS", Journal of Physical Chemistry B, 2005, vol. 109, pp. 16161-16168.
English et al., "Hydrophobically Modified Associative Polymer Solutions: Rheology and Microstructure in The Presence of Nonionic Surfactants", Industrial Engineering Chemistry Research, 2002, vol. 41, pp. 6425-6435.
Hu et al., "Fluorescence Studies of The Interaction of Sodium Dodecyl Sulfate With Hydrophobically Modified Poly (ethylene oxide)", Langmuir, 1990, vol. 6, pp. 880-883.
Lu et al., "New Surfactant Developments For Chemical Enhanced Oil Recovery", Journal of Petroleum Science and Engineering, 2014, vol. 120, pp. 94-101.
Imae et al., "Sphere-Rod Transition of Micelles of Tetradecyltrimethylammonium Halides in Aqueous Sodium Halide Solutions and Flexibility and Entanglement of Long Rodlike Micelles", Journal of Physical Chemistry, 1986, vol. 90, pp. 5216-5223.
Panmai et al., "Rheology of Hydrophobically Modified Polymers With Spherical and Rod-Like Surfactant Micelles", Colloids and Surfaces A: Physiochemical and Engineering Aspects, 1999, vol. 147, pp. 3-15.

\* cited by examiner

*Primary Examiner* — Kumar R Bhushan
(74) *Attorney, Agent, or Firm* — Scott F. Yarnell (57) ABSTRACT

An aqueous injection fluid including: a polymer comprising hydrophilic moieties and a plurality of hydrophobic groups; and a surfactant that changes shape based on salinity and/or temperature.

15 Claims, 6 Drawing Sheets

FORMATION OF IN-SITU ACTIVATED INJECTION FLUIDS FOR ENHANCED OIL RECOVERY APPLICATIONS

CROSS REFERENCE TO RELATED APPLICATION

This application claims priority to U.S. Provisional Application Ser. No. 62/659,819 filed Apr. 19, 2018, which is herein incorporated by reference in its entirety.

FIELD

Exemplary embodiments described herein relate to aqueous injections fluids, methods of making the aqueous injection fluids, and methods of using the aqueous injection fluids for enhanced oil recovery.

BACKGROUND

This section is intended to introduce various aspects of the art, which may be associated with exemplary embodiments of the present technological advancement. This discussion is believed to assist in providing a framework to facilitate a better understanding of particular aspects of the present technological advancement. Accordingly, it should be understood that this section should be read in this light, and not necessarily as admissions of prior art.

The recovery of petroleum from oil-bearing reservoirs initially involves drilling into the reservoir and utilizing the natural pressure forces for production, also known as primary recovery. However, these primary recovery methods only recover a minor portion of the oil present in the reservoir resulting in a majority of the original oil-in-place (OOIP) in the reservoirs remaining unrecovered. Consequently, further enhanced methods of oil recovery have been developed, known as secondary and tertiary recovery. Secondary recovery typically involves fluid injection, such as water flooding processes. For example, water may be injected to sweep or recover oil from the oil reservoir by increasing the reservoir's pressure. Such secondary recovery methods have their limits including poor sweep efficiency caused by injection fluid (e.g., water) having a higher mobility than the oil-in-place resulting in viscous fingering of the injection fluid through the oil and a reduction in recovery. Thus, over half of the OOIP may still remain in the reservoir following secondary recovery necessitating further tertiary oil recovery.

Although the low waterflood recovery is due to a combination of multiple factors, poor sweep efficiency is one of the leading causes. Reservoirs present very harsh conditions for injection fluids. The injection fluid undergoes large changes in applied shear rate as it is pumped from the surface to the reservoir (as high as $10^5 s^{-1}$). At these high shear rates, pumping losses of conventionally used polymer solutions is significant.

Typically, tertiary oil recovery methods seek to increase the mobility of the oil in order to increase extraction. For example, thermal methods may heat the oil, thus reducing the oil's viscosity to make it more easily extracted. Steam injection may also be performed to extract further oil. Another tertiary recovery technique involves use of aqueous injection fluids comprising polymers to increase viscosity of the injection fluid to better mobilize the oil for extraction, reduce fingering and improve sweep efficiency. However, conventional approaches involve using high molecular weight polymers, such as xanthan or hydrolyzed polyacrylamide (HPAM). The high molecular weight of these polymers and the resulting high viscosity of the injection fluid leads to energy intensive and high cost pumping. These high molecular weight polymers (e.g., tens of million Da) with their larger coil size suffer from undesirable shear degradation while passing through pumps, chokes and screens during injection even before the injection fluid enters the reservoir, which can consume significant amounts of the injected polymer. Therefore, these high molecular weight polymers may show a larger loss in viscosity compared to their initial viscosity when not subjected to shear stress. Consequently, excess polymer may be added to achieve the desired viscosity in the reservoir to compensate for the shear degradation of the polymers during the recovery leading to increased costs for more and more polymer. While lower molecular weight polymers may be used to decrease the problem of shear degradation, increased concentrations of the lower molecular weight polymers are needed for increasing the viscosity of the injection fluid, which also results in increased costs. Furthermore, conventional techniques using polymer-containing injection fluids can require use of more than one injection fluid following injection of the polymer-containing injection fluid, such as water, a brine fluid or polymer post-flush fluid.

Also, polymers such, as HPAM, can lose viscosification when used in oil reservoirs having high salinity concentrations. More specifically, such typical high molecular weight polymers contain charges along their backbone to increase hydrodynamic size for increasing viscosity. However, when under high salinity conditions, the electrostatic charges on the polymer backbone may be screened in the presence of salt, which can cause chain collapse and loss of viscosification.

SUMMARY

An aqueous injection fluid including: a polymer comprising hydrophilic moieties and a plurality of hydrophobic groups; and a surfactant that changes shape based on salinity and/or temperature.

In the aqueous injection fluid, the surfactant can undergo a sphere-to-rod transition based on salinity and/or temperature.

In the aqueous injection fluid, the surfactant can be selected from the group consisting of alkylated propylene oxide ethylene oxide sulfates, sodium dodecyl sulfate, pluronic type triblock copolymer surfactants, and a combination thereof.

In the aqueous injection fluid, the hydrophobic groups can be selected from the group consisting of a $C_8$-$C_{18}$ alkyl an aralkyl, an alkylphenol, a haloalkyl, a quaternary ammonium halide and a combination thereof.

In the aqueous injection fluid, the hydrophilic moieties can be selected from the group consisting of an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acids, a diallyl ammonium compound, a vinyl heterocyclic amide, a vinylaryl sulfonate, hydrolyzed acrylamide, non-hydrolyzed acrylamide, ethylene oxide, a monosaccharide, a urethane, and a combination thereof.

In the aqueous injection fluid, the polymer can be present in an amount of about 0.05 wt % to about 2.0 wt %, and the surfactant is present in an amount of about 0.05 wt % to about 2.0 wt %.

In the aqueous injection fluid, a viscosity of the aqueous injection fluid can change as a function of salinity and/or temperature.

A method for recovering oil from an oil reservoir, wherein the method includes: forcing oil into a producing well by introducing an aqueous injection fluid into the oil reservoir, wherein the aqueous injection fluid includes, a polymer comprising hydrophilic moieties and a plurality of hydrophobic groups, and a surfactant that changes shape within the oil reservoir based on salinity and/or temperature of the oil reservoir.

The method can include injecting the aqueous injection fluid into the oil reservoir, wherein the aqueous injection fluid has a first viscosity at a point of injection, and wherein the aqueous injection fluid adaptively increases in viscosity to a second viscosity as the aqueous injection fluid encounters the oil reservoir.

The method can include designing the aqueous injection fluid by controlling surfactant concentration by weight in the aqueous injection fluid and selecting the surfactant so the aqueous injection fluid has a peak viscosity that corresponds to a predetermined viscosity needed for the oil reservoir based on temperature and salinity within the oil reservoir.

In the method, the surfactant can undergo a sphere-to-rod transition based on salinity and/or temperature.

In the method, the surfactant can be selected from the group consisting of alkylated propylene oxide ethylene oxide sulfates, sodium dodecyl sulfate, pluronic type triblock copolymer surfactants, and a combination thereof.

In the method, the hydrophobic groups can be selected from the group consisting of a $C_8$-$C_{18}$ alkyl, an aryl, an aralkyl, an alkylphenol, a haloalkyl, a quaternary ammonium halide, and a combination thereof.

In the method, the hydrophilic moieties can be selected from the group consisting of an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acids, a diallyl ammonium compound, a vinyl heterocyclic amide, a vinylaryl sulfonate, hydrolyzed acrylamide, non-hydrolyzed acrylamide, ethylene oxide, a monosaccharide, a urethane, and a combination thereof.

In the method, the polymer can be present in an amount of about 0.05 wt % to about 2.0 wt %, and the surfactant is present in an amount of about 0.05 wt % to about 2.0 wt %.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION OF THE INVENTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

I. Overview

The present technological advancement can make use of self-healing, in-situ activated enhanced oil recovery injection fluid including hydrophobically-modified (HM) polymers and surfactant micelles. This fluid can enable an increased viscosity injection fluid necessary in many enhanced oil recovery (EOR) processes. HM polymers are water-soluble polymers whose end groups have been modified by the addition of small hydrocarbon moieties. The in-situ activated injection fluids (sometimes referred to as in-situ injection fluids) can possess low viscosity at the time of injection and be activated upon contact with the reservoir to obtain desired high viscosity properties required for EOR applications. At pumping facilities on the surface, the viscosity of the formulation is low, decreasing pumping losses and hence pumping costs. An in-situ injection fluid embodying the present technological advancement can be achieved by using a combination of HM polymers and surfactant micelles. The micelles can change morphology depending on salinity and temperature conditions. By an appropriate choice of HM polymer and surfactant, specific in-situ injection fluids of required viscosity can be achieved for a range of different reservoir salinity and temperature conditions.

Surfactants discussed in the examples that follow are alkylated propylene oxide ethylene oxide sulfates. The general notation mPnE is used to classify the surfactants, where m and n refer to the number of propylene oxide and ethylene oxide groups respectively. m and n can each independently range from 1 to 100, but values of 1 to 10 may be preferred. The examples that follow show that by either increasing salinity or temperature, one can cause the micelles to undergo a sphere-to-rod transition. Compared to spherical micelles, the elongated cylindrical or worm-like micelles allows for the hydrophobically modified polymers to interact with them more effectively over longer length scales, and forms a more interconnected network, increasing the average distance over which hydrophobes can interact with each other. As a consequence, the viscosity of the overall solution increases.

The combination of HM Polymers and cylindrical micelles leads to a shear-stable fluid that has greatly enhanced viscosity that can improve sweep efficiency. Moreover, because the micelles only lengthen under specific regimes of salinity and temperature, the injection fluid formulation can be designed such that the formulation remains low viscosity at pumps, chokes and other facilities, but has the desired viscosity for improved sweep efficiency under reservoir conditions. Such a formulation would decrease pumping losses by many orders of magnitude. Because the interactions between the hydrophobes and micelles is reversible, our formulation provides tunable viscosity for optimal sweep efficiency without suffering shear degradation.

The present technological advancement can enable higher viscosity fluids only where it is desired i.e. in the reservoir. At pumping facilities, the viscosity of an EOR injection fluid embodying the present technological advancement can be lower because of the difference in salinity and temperature between surface water and the reservoir. This leads to lower pumping losses and a significantly less expensive injection process.

II. Definitions

For purposes of the description of the present technological advancement and the claims attached hereto, the numbering scheme for the Periodic Table Groups is according to the IUPAC Periodic Table of Elements.

The term "and/or" as used in a phrase such as "A and/or B" herein is intended to include "A and B", "A or B", "A", and "B".

The terms "substituent", "radical", "group", and "moiety" may be used interchangeably.

As used herein, and unless otherwise specified, the term "Cn" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

As used herein, and unless otherwise specified, the term "alkyl" refers to a saturated hydrocarbon radical. Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g. $CH_2CH_2CH_2CH_3$, —$(CH_3)CHCH_2CH_3$, —$CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "aryl" refers to any monocyclic or polycyclic cyclized carbon radical containing 6 to 14 carbon ring atoms, wherein at least one ring is an aromatic hydrocarbon. Examples of aryls include, but are not limited to, phenyl, naphthyl, pyridinyl, and indolyl.

As used herein, and unless otherwise specified, the term "aralkyl" refers to an alkyl group substituted with an aryl group. The alkyl group may be a $C_1$-$C_{10}$ alkyl group, particularly a $C_1$-$C_6$, particularly a $C_1$-$C_4$ alkyl group, and particularly a $C_1$-$C_3$ alkyl group. Examples of aralkyl groups include, but are not limited to, phenylmethyl, phenylethyl, and naphthylmethyl. The aralkyl may comprise one or more heteroatoms and be referred to as a "heteroaralkyl." Examples of heteroatoms include, but are not limited to, nitrogen (i.e., nitrogen-containing heteroaralkyl), oxygen (i.e., oxygen-containing heteroaralkyl), and/or sulfur (i.e., sulfur-containing heteroaralkyl). Examples of heteroaralkyl groups include, but are not limited to, pyridinylethyl, indolylmethyl, furylethyl, and quinolinylpropyl.

As used herein, and unless otherwise specified, the term "halogen" or "halide" refers to flourine (F), chlorine (Cl), bromine (Br) and iodine (I).

As used herein, and unless otherwise specified, the term "haloalkyl" refers to an alkyl moiety as described herein in which one or more of the hydrogen atoms has been replaced by a halogen atom. For example, haloalkyls include, but are not limited to, —$CZ_m$, —$(CH_2)_p(CZ_2)_qCZ_3$, wherein m is 1 to 3, p is zero to 20, q is zero to 20 and each Z is independently F, Cl, Br or I, etc. Examples of haloalkyls include, but are not limited to, chloromethyl, fluoromethyl, bromomethyl, trifluoromethyl, dichloromethyl, 2-chloro-2-fluoroethyl, 6,6,6-trichlorohexyl and the like.

As used herein, the term "hydrophobic" refers to substance or a moiety, which lacks an affinity for water. That is, a hydrophobic substance or moiety tends to substantially repel water, is substantially insoluble in water, does not substantially mix with or be wetted by water or to do so only to a very limited degree and/or does not absorb water or, again, to do so only to a very limited degree.

As used herein, the term "hydrophilic" refers to substance or a moiety, which has an affinity for water. That is, a hydrophilic substance or moiety tends to substantially attract water, is substantially soluble in water, and/or is substantially miscible with or wetted by water.

As used herein, the term "oil" refers to petroleum that exists in the liquid phase in natural subsurface formations and remains liquid at atmospheric conditions of pressure and temperature. Petroleum refers to a complex mixture of hydrocarbons, chemical compounds containing only hydrogen and carbon, with small amounts of other substances. Oil may include other elements, for example, oxygen ($O_2$), hydrogen sulfide ($H_2S$), nitrogen ($N_2$) and/or sulfur (S).

As used herein, the term "formation" refers to any igneous, sedimentary, or metamorphic rock represented as a unit or any sedimentary bed or consecutive series of beds sufficiently homogeneous or distinctive to be a unit.

As used herein, the term "reservoir" refers to a formation or a portion of a formation.

As used herein, "self-healing" refers to a reversible transient bonds reforming. For example, when hydrophobically modified polymers are sheared, the transient bonds connecting them into a network are temporarily broken. However, these bonds are reversible broken and reformed. The network self-heals after the cessation of shear, and the reversible transient bonds reform. Of course, at very high shear rates, these polymers will degrade too, but because these polymers are lower in molecular weight compared to HPAM, the shear-induced degradation is greatly reduced, and also happens at much higher shear rates compared to HPAM.

As used herein, the term "zone" refers to a reservoir or a portion of a reservoir.

As used herein, the term "lipophilic" refers to a substance or moiety which has an affinity for oil and/or hydrocarbons. That is, a lipophilic substance or moiety tends to substantially attract oil and/or hydrocarbons, is substantially soluble in oil and/or hydrocarbons, and/or is substantially miscible with oil and/or hydrocarbons. A lipophilic substance or moiety may also have greater solubility in non-polar solvents.

As used herein, the term "amphiphilic" refers to a molecule containing both hydrophilic and lipophilic moieties.

As used herein, "molecular weight" refers to the weight average molecular weight (Mw). Unless otherwise noted, all molecular weight units are g/mol.

As used herein, "sphere-to-rod transition" means an elongation or expansion in shape in one or multiple dimensions, and includes but is not limited to a change in shape from a spheroid to an elongated rod, to a cylinder, to a prolate spheroid, or to an oblate spheroid. Such an elongation or expansion does not necessarily result in a regular shape, and "sphere-to-rod" includes any and all resulting irregular shapes, including a wormlike shape, that may result from an elongation or expansion in one or more dimensions.

III. Aqueous Injection Fluid

The present technological advancement relates to various aqueous injection fluids suitable for use in oil recovery techniques. In particular, the aqueous injection fluids described herein can adaptively have suitable ranges of viscosity for extracting oil and can advantageously withstand harsh conditions present in oil reservoirs during oil recovery, e.g., large changes in applied shear rate as it is pumped from the surface to the oil reservoirs (e.g., as high as $10^5$ s$^{-1}$) without a significant loss of viscosity. In a first embodiment, an aqueous injection fluid is provided including: a polymer comprising hydrophilic moieties and a plurality of hydrophobic groups; and a surfactant that adaptively changes shape (e.g., a sphere-to-rod transition) based on reservoir conditions (e.g., salinity and/or temperature) and/or surfactant concentration by weight in the aqueous injection fluid.

IV. A. Polymer with Hydrophilic Moieties and Hydrophobic Groups

To increase viscosity of an aqueous injection fluid, polymers comprising hydrophilic moieties and a plurality of hydrophobic groups may be used. The hydrophobic groups may be present as pendant groups or side groups on the hydrophilic moieties. Suitable hydrophilic moieties include those which are sufficiently water-soluble and readily undergo addition polymerization to form polymers which are water-soluble. Such hydrophilic moieties include, but are not limited to, ethylene oxide, an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acid, a diallyl ammonium compound, a vinyl heterocyclic amide, a vinylaryl sulfonate, a monosaccharide, a urethane, salts of the aforementioned monomers and combinations thereof. Exemplary ethylenically unsaturated amides include, but are not limited to acrylamide, methacrylamide and fumaramide and their N-substituted derivatives, such as 2-acrylamido-2-methylpropane sulfonic acid (AMPS), N-(dimethylaminomethyl)acrylamide as well as N-(trimethylammoniummethyl)acrylamide chloride and N-(trimethylammoniumpropyl)methacrylamide chloride. The acrylamide may include hydrolyzed acrylamide and non-hydrolyzed acrylamide. Exemplary ethylenically unsaturated carboxylic acids include but are not limited to acrylic acid, methacrylic acid, itaconic acid and fumaric acid. Exemplary sulfoalkyl esters of unsaturated carboxylic acid include, but are not limited to 2-sulfoethyl methacrylate. Exemplary aminoalkyl esters of unsaturated carboxylic acids include, but are not limited to 2-aminoethyl methacrylate. Exemplary diallyl ammonium compounds include, but are not limited to diallyl dimethyl ammonium chloride. Exemplary vinyl heterocyclic amides include, but are not limited to vinyl pyrrolidone. Exemplary vinylaryl sulfonates include, but are not limited to vinylbenzyl sulfonate. Exemplary monosaccharides include, but are not limited to glucose, fructose, galactose, mannose and gulose. In particular, the hydrophilic moieties may be selected from the group consisting of urethanes, saccharides, hydrolyzed acrylamide, non-hydrolyzed acrylamide, ethylene oxide and combinations thereof.

Suitable hydrophobic groups include those which are substantially water insoluble, such as, but are not limited to alkyls, aryls, aralkyls, alkylphenols, haloalkyls, quaternary ammonium halides and combinations thereof. Exemplary alkyls include $C_4$-$C_{20}$ alkyls or $C_8$-$C_{18}$ alkyls. Exemplary aryls include phenyl, naphthyl, pyridinyl, and indolyl. Exemplary aralkyls include $C_1$-$C_{10}$ alkyls, such as, but not limited to phenylmethyl, phenylethyl, phenylbutyl, phenylpropyl, phenylpentyl, naphthylmethyl and the like. Exemplary alkylphenols include $C_1$-$C_{10}$ alkyls, such as, but not limited to methylphenol, ethylphenol, propylphenol, butylphenol, amylphenol, heptylphenol, octylphenol, nonylphenol, and dodecylphenol. Exemplary haloalkyls include one or more carbons or four or more carbons and one to three halides, such as, but not limited to chloromethyl, chloropropyl, chlorobutyl, fluoromethyl, fluoropropyl, fluorobutyl, flurobromomethyl, trifluoromethyl, difluoromethyl, dichloromethyl, 2-chloro-2-fluoroethyl, 6,6,6-trichlorohexyl and the like. Exemplary quaternary ammounium halides include benzalkonium chloride, benzethonium chloride, methylbenzethonium chloride, cetalkonium chloride, cetylpyridinium chloride, cetrimonium chloride, cetrimonium bromide, cetrimide, dofanium chloride, tetraethylammonium bromide, didecyldimethylammonium chloride and domiphen bromide.

The aforementioned polymers containing hydrophilic moieties and a plurality of hydrophobic groups may be prepared by copolymerizing the hydrophilic moieties with the hydrophobic groups by any of the conventional polymerization techniques or by any other suitable techniques. See, e.g., U.S. Pat. Nos. 4,432,881; 4,814,096; 4,702,319; and 7,427,583, each of which is hereby incorporated by reference in their entirety.

Advantageously, the polymers described herein can have a lower molecular weight, which is especially useful for oil reservoirs with lower permeability (e.g., permeability between about 1 millidarcy and about 100 millidarcy. Higher molecular weight polymers (e.g., hydrolyzed polyacrylamide, xanthan gum) can be problematic due to their large coil size, which can cause such high molecular weight polymers to become trapped in the pores of lower permeability reservoirs leading to reservoir damage. Thus, the higher molecular weight polymers may be limited to use in injection fluids for high permeability reservoirs (e.g., greater than about 100 millidarcy).

Thus, in various aspects, the polymer described herein may have a molecular weight of at least about 1,000 g/mol, at least about 5,000 g/mol, at least about 10,000 g/mol, at least about 25,000 g/mol, at least about 50,000 g/mol, at least about 75,000 g/mol, at least about 100,000 g/mol, at least about 150,000 g/mol, at least about 200,000 g/mol, at least about 250,000 g/mol, at least about 300,000 g/mol, at least about 350,000 g/mol, at least about 400,000 g/mol, at least about 450,000 g/mol, at least about 500,000 g/mol, at least about 550,000 g/mol, at least about 600,000 g/mol, at least about 650,000 g/mol, at least about 700,000 g/mol, at least about 750,000 g/mol, at least about 800,000 g/mol, at least about 850,000 g/mol, at least about 900,000 g/mol, at least about 950,000 g/mol, at least about 1,000,000 g/mol, at least about 1,100,000 g/mol, at least about 1,200,000 g/mol, at least about 1,300,000 g/mol, at least about 1,400,000 g/mol, at least about 1,500,000 g/mol, at least about 1,600,000 g/mol, at least about 1,700,000 g/mol, at least about 1,800,000 g/mol, at least about 1,900,000 g/mol, at least about 2,000,000 g/mol, at least about 3,000,000 g/mol, at least about 4,000,000 g/mol, or about 5,000,000 g/mol. Additionally or alternatively, the polymer described herein may have a molecular weight of about 1,000 g/mol to about 5,000,000 g/mol, about 1,000 g/mol to about 2,000,000 g/mol, about 1,000 g/mol to about 1,000,000 g/mol, about 1,000 g/mol to about 500,000 g/mol, about 10,000 g/mol to about 5,000,000 g/mol, about 10,000 g/mol to about 4,000,000 g/mol, about 10,000 g/mol to about 3,000,000 g/mol, about 10,000 g/mol to about 2,000,000 g/mol, about 10,000 g/mol to about 1,500,000 g/mol, about 10,000 g/mol to about 1,000,000 g/mol, about 10,000 g/mol to about 900,000 g/mol, about 10,000 g/mol to about 800,000 g/mol, about 10,000 g/mol to about 700,000 g/mol, about 10,000 g/mol to about 600,000 g/mol, about 10,000 g/mol to about 500,000 g/mol, about 10,000 g/mol to about 400,000 g/mol, about 10,000 g/mol to about 300,000 g/mol, about 10,000 g/mol to about 200,000 g/mol, about 10,000 g/mol to about 100,000 g/mol, about 10,000 g/mol to about 75,000 g/mol, about 10,000 g/mol to about 50,000 g/mol, or about 10,000 g/mol to about 25,000 g/mol. In particular, the polymer described herein may have a molecular weight of about 1,000 g/mol to about 2,000,000 g/mol, about 10,000 g/mol to about 2,000,000 g/mol or about 10,000 g/mol to about 1,000,000 g/mol.

Further, the polymer describe herein may be present in the aqueous injection fluid in advantageously lower concentrations. For example, the polymer may be present in an amount of at least about 0.02 wt %, at least about 0.05 wt %, at least about 0.07 wt %, at least about 0.10 wt %, at least about 0.20 wt %, at least about 0.30 wt %, at least about 0.40 wt %, at least about 0.50 wt %, at least about 0.60 wt %, at least about 0.70 wt %, at least about 0.80 wt %, at least about 0.90 wt %, at least about 1.0 wt %, at least about 2.0 wt %, at least about 3.0 wt %, at least about 4.0 wt %, or about 5.0 wt %. Additionally or alternatively, the polymer may be present in an amount of 0.02 wt % to about 5.0 wt %, about 0.02 wt % to about 3.0 wt %, about 0.02 wt % to about 1.0 wt %, about 0.02 wt % to about 0.50 wt %, 0.05 wt % to about 5.0 wt %, about 0.05 wt % to about 3.0 wt %, about 0.05 wt % to about 1.0 wt %, about 0.05 wt % to about 0.90 wt %, about 0.05 wt % to about 0.80 wt %, about 0.05 wt % to about 0.70 wt %, about 0.05 wt % to about 0.60 wt %, about 0.05 wt % to about 0.50 wt %, about 0.05 wt % to about 0.40 wt %, about 0.05 wt % to about 0.30 wt %, about 0.05 wt % to about 0.20 wt %, or about 0.05 wt % to about 0.10 wt %. In particular, the polymer may be present in an amount of about 0.02 wt % to about 3.0 wt %, about 0.05 wt % to about 2.0 wt %, about 0.05 wt % to about 1.0 wt % or about 0.07 wt % to about 0.80 wt %.

IV. B. Surfactant

In addition to the polymer, the aqueous injection fluid may further include a surfactant. The present technological advancement can utilize any surfactant that has the property of a sphere-to-rod transition that is based on temperature, salinity, and or surfactant concentration. The examples discussed herein utilize alkylated propylene oxide ethylene oxide sulfates. However, the following additional surfactants can be used: sodium dodecyl sulfate (SDS), cetyltrimethylammonium bromide (CTAB), cetyltrimethylammonium chloride (CTAC), didodecyldimethylammonium bromide (DDAB), and didodecyldimethylammonium chloride (DDAC). This listing is not intended to be exhaustive.

For the purpose of EOR, those of ordinary skill in the art will be able to select an appropriate surfactant and its concentration for an injection fluid that embodies the present technological advancement for the particular temperature and pressure characteristics of a given subsurface reservoir.

The surfactant described herein may be present in the aqueous injection fluid in various concentrations. However, keeping the surfactant concentration below 1 wt % has cost benefits. Surfactants are relatively expensive, so minimizing how much we need to use is beneficial. Typically, dosage ranges for surfactants are about 1 wt %. For example, the surfactant may be present in an amount of at least about 0.02 wt %, at least about 0.05 wt %, at least about 0.07 wt %, at least about 0.10 wt %, at least about 0.20 wt %, at least about 0.30 wt %, at least about 0.40 wt %, at least about 0.50 wt %, at least about 0.60 wt %, at least about 0.70 wt %, at least about 0.80 wt %, at least about 0.90 wt %, at least about 1.0 wt %, at least about 2.0 wt %, at least about 3.0 wt %, at least about 4.0 wt %, or about 5.0 wt %. Additionally or alternatively, the surfactant may be present in an amount of 0.02 wt % to about 5.0 wt %, about 0.02 wt % to about 3.0 wt %, about 0.02 wt % to about 1.0 wt %, about 0.02 wt % to about 0.50 wt %, 0.05 wt % to about 5.0 wt %, about 0.05 wt % to about 3.0 wt %, about 0.05 wt % to about 1.0 wt %, about 0.05 wt % to about 0.90 wt %, about 0.05 wt % to about 0.80 wt %, about 0.05 wt % to about 0.70 wt %, about 0.05 wt % to about 0.60 wt %, about 0.05 wt % to about 0.50 wt %, about 0.05 wt % to about 0.40 wt %, about 0.05 wt % to about 0.30 wt %, about 0.05 wt % to about 0.20 wt %, or about 0.05 wt % to about 0.10 wt %. In particular, the surfactant may be present in an amount of about 0.02 wt % to about 3.0 wt %, about 0.05 wt % to about 2.0 wt %, about 0.05 wt % to about 1.0 wt % or about 0.07 wt % to about 0.80 wt %.

Without being bound by theory, it is believed that the combination of the surfactant and the HM polymers exhibit cooperative effects and the viscosity of the mixture is a few orders of magnitude higher than the individual solutions. The surfactants form micelles in solution, and the interior core of these micelles are hydrophobic environments because of the high concentration of surfactant tails. When hydrophobically modified polymers are added to the solution, the hydrophobic ends are repelled by the polar water environment and hence incorporate themselves into the hydrophobic surfactant micelles. This linking up of the polymer chains with the surfactant micelles leads to network formation and increased viscoelasticity of the network. In the cases where surfactants form worm-like micelles due to changes in salinity and temperature, the interaction between the hydrophobes and the surfactant micelles remains the same, but network formation is more effective because of the longer length scales spanned by the cylindrical or worm-like micelles. Hydrophobes attached to multiple polymer chains are connected through a single elongated micelle.

In certain variations, no more than a single surfactant agent may be present in the aqueous injection fluid. Alternatively, the aqueous injection fluid may further comprise one or more of the surfactant agents described above.

IV. C. Viscosity and Shear Degradation

As discussed above, the aqueous injection fluids described herein have increased viscosity rendering them especially well-suited for enhanced oil recovery. For example, the aqueous injection fluids described herein can adaptively achieve a greater viscosity compared to a viscosity of an aqueous fluid including the polymer described herein without the described surfactants. In various aspects, the aqueous injection fluids described herein can adaptively achieve a viscosity at least about 2 times greater, at least about 3 times greater, at least about 4 times greater, at least about 5 times greater, at least about 6 times greater, at least about 7 times greater, at least about 8 times greater, at least about 9 times greater or about 10 times greater compared to a viscosity of an aqueous injection fluid including the polymer described herein without the described surfactants.

In particular, the aqueous injection fluids described herein can adaptively achieve a viscosity of at least about 5 cP, at least about 10 cP, at least about 50 cP, at least about 100 cP, at least about 200 cP, at least about 300 cP, at least about 400 cP, at least about 500 cP, at least about 600 cP, at least about 700 cP, at least about 800 cP, at least about 900 cP, at least about 1000 cP, at least about 1200 cP, or about 1500 cP. Additionally or alternatively, the aqueous injection fluids described herein can adaptively achieve a viscosity of about 5 cP to about 1500 cP, about 5 cP to about 1200 cP, about 5 cP to about 1000 cP, about 10 cP to about 1500 cP, about 10 cP to about 1200 cP, about 10 cP to about 1000 cP, about 100 to about 1500 cP, about 100 to about 1200 cP, about 100 to about 1000 cP, about 500 to about 1500 cP, about 500 to about 1200 cP or about 500 to about 1000 cP. In particular, the aqueous injection fluids described herein can adaptively achieve a viscosity of about 10 cP to about 1500 cP, about 10 cP to about 1200 cP, about 10 cP to about 1000 cP, about 100 to about 1200 cP, about 100 to about 1000 cP, about 500 to about 1200 cP or about 500 to about 1000 cP. Unless otherwise indicated, the viscosity measurements discussed herein were performed with an Anton Paar MCR 302 stress controlled rheometer with a double wall Couette fixture at a temperature of 25° C.

Additionally or alternatively, the aqueous injection fluids described herein advantageously may have substantially no shear degradation at a shear rate of at least about 10 $s^{-1}$, at least about 100 $s^{-1}$, at least about 200 $s^{-1}$, at least about 300 $s^{-1}$, at least about 400 $s^{-1}$, at least about 500 $s^{-1}$, at least about 600 $s^{-1}$, at least about 700 $s^{-1}$, at least about 800 $s^{-1}$, at least about 900 $s^{-1}$, or up to about 1000 $s^{-1}$. As used herein, "shear degradation" refers to permanent degradation or breaking of the polymer chain in the aqueous injection fluid. In particular, the aqueous injection fluids described herein advantageously may have substantially no shear degradation at a shear rate up to about 1000 $s^{-1}$.

V. Methods of Preparing Aqueous Injection Fluids

In additional embodiments, methods of preparing the aqueous injection fluids are provided. The method may comprise mixing an aqueous solution of water, sea water, and/or produced water with HM polymers and the described surfactants. The mixture may be agitated for a suitable amount of time to form an EOR injection fluid. Additionally, the mixture may be allowed to equilibrate for at least about 3 days, at least about 7 days, at least about 10 days, From a kinetic perspective, it can help to first make up the surfactant solution and then add that to a polymer solution. The overall mixture might reach equilibrium faster in this manner.

Additionally, other materials, polymers, surfactants, and/or chemical additives may be added to the mixture as needed to achieve an EOR injection fluid suitable for a given reservoir. For example, in an EOR context, the in-situ injection fluid can include seawater and/or produced water from the oil reservoir.

VI. Methods for Recovering Oil

As discussed above, the aqueous injection fluids described herein have adaptable viscosity along with shear stability making them particularly well-suited for oil recovery. Thus, methods of recovering oil from an oil reservoir using the aqueous injection fluids described herein are provided.

In one embodiment, the method comprises introducing an aqueous injection fluid into the oil reservoir (i.e., through an injection well or other access point to the oil reservoir) to force the oil into a producing well for recovery. The aqueous injection fluid comprises: a polymer comprising hydrophilic moieties as described herein and a plurality of hydrophobic groups as described herein; and a surfactant as described herein.

The oil reservoir may have a salinity concentration by weight of at least about 3,000 ppm, at least about 5,000 ppm, at least about 10,000 ppm, at least about 25,000 ppm, at least about 50,000 ppm, at least about 75,000 ppm, at least about 100,000 ppm, at least about 125,000 ppm, at least about 150,000 ppm, at least about 175,000 ppm or up to about 200,000 ppm. In particular, the oil reservoir may have a salinity concentration of at least about 5,000 ppm, or up to about 2000,000 ppm. Additionally or alternatively, the oil reservoir may have a salinity concentration of about 3,000 ppm to about 200,000 ppm, about 3,000 ppm to about 150,000 ppm, about 3,000 ppm to about 125,000 ppm, about 3,000 ppm to about 100,000 ppm, about 3,000 ppm to about 75,000 ppm, about 3,000 ppm to about 50,000 ppm, about 3,000 ppm to about 25,000 ppm, about 3,000 ppm to about 10,000 ppm, about 5,000 ppm to about 200,000 ppm, about 5,000 ppm to about 150,000 ppm, about 5,000 ppm to about 125,000 ppm, about 5,000 ppm to about 100,000 ppm, about 5,000 ppm to about 75,000 ppm, about 5,000 ppm to about 50,000 ppm, about 5,000 ppm to about 25,000 ppm, about 5,000 ppm to about 10,000 ppm, about 25,000 ppm to about 200,000 ppm, about 25,000 ppm to about 150,000 ppm, about 25,000 ppm to about 125,000 ppm, about 25,000 ppm to about 100,000 ppm, about 25,000 ppm to about 75,000 ppm, about 25,000 ppm to about 50,000 ppm, about 50,000 ppm to about 200,000 ppm, about 50,000 ppm to about 150,000 ppm, about 50,000 ppm to about 125,000 ppm, about 5,0000 ppm to about 100,000 ppm, or about 50,000 ppm to about 75,000 ppm.

Reservoir temperature is governed primarily by the reservoir's proximity to the earth's mantle, and by the relative heat exchange capacities and thermal conductivities of the formations forming the lithostatic sequence that includes the reservoir. The geothermal gradient resulting from the heat-exchange process varies from basin to basin, but within a specific area the variations are small. In most hydrocarbon-producing areas, the gradient is usually in the range of 0.6 to 1.6° F. per 100 ft of depth increase. Areas where the earth's crust is thinner than average, to such as volcanic and geothermal areas, have much higher gradients. In thin-crust areas the gradient change averages 4° F. per 100 ft of depth increase. Local temperature gradients at depth have been reported as high as 10° F. per 100 ft approaching singularities (e.g., major faults, areas of tectonic movement) in the earth's crust in geothermal areas. Many techniques exist for obtaining bottomhole reservoir temperature or temperature of particular zones. A variety of logging techniques may be used and those of ordinary skill in the art are familiar with conventional reservoir temperature measurement techniques. Also, downhole temperature can be calculated by adding the surface temperature to the product of the depth and the geothermal gradient.

Those of ordinary skill in the art can select from the above-described surfactants to have an injection fluid that adapts to the relevant salinity concentration for a given oil reservoir.

In the oil recovering methods described herein, the aqueous injection fluids described herein may be introduced into the oil reservoir under suitable conditions. For example, the injection fluids described herein may be introduced under a pressure of about 100 psi to about 6000 psi and a temperature of about 60° F. (15.56° C.) to about 150° F. (65.56° C.).

Advantageously, the aqueous injection fluid may be introduced as a single injection fluid in the above-described methods. That is, no further fluids may be necessary following introduction of the aqueous injection fluid, for example, there may be no need for a further brine or post-polymer flush fluid. However, the present technological advancement can be used with multiple injection fluids, some or all of which may include in-situ injections fluids.

Furthermore, an oil reservoir may be divided into zones. The in-situ injection fluid can be designed to increase its viscosity for a particular zone of the oil reservoir based on the salinity and/or temperature environment of that particular zone.

VII. Methods for Increasing Viscosity of an Injection Fluid

In additional embodiments, methods for creating an aqueous injection fluid with an adaptable or variable viscosity are provided. The method comprises: mixing an aqueous solution with HM polymers as described herein and surfactants as described herein. Based on the combination of HM polymer and surfactant(s) used, the aqueous injection fluid can adaptively achieve a viscosity that varies between about 10 cP to about 1,000 cP and adapt to given reservoir conditions. Additionally or alternatively, the aqueous injection fluids may have a variable viscosity that adapts to reservoir conditions of about 10 cP to about 1500 cP, about 10 cP to about 1200 cP, about 10 cP to about 1000 cP, about 100 to about 1500 cP, about 100 to about 1200 cP, about 100 to about 1000 cP, about 500 to about 1500 cP, about 500 to about 1200 cP or about 500 to about 1000 cP. In particular, the aqueous injection fluids may have a variable viscosity that adapts to reservoir conditions of about 10 cP to about 1500 cP, about 10 cP to about 1200 cP, about 10 cP to about 1000 cP, about 100 to about 1200 cP, about 100 to about 1000 cP, about 500 to about 1200 cP or about 500 to about 1000 cP.

Additionally or alternatively, the aqueous injection fluids advantageously may have substantially no shear degradation at a shear rate of at least about 10 s$^{-1}$, at least about 100 s$^{-1}$, at least about 200 s$^{-1}$, at least about 300 s$^{-1}$, at least about 400 s$^{-1}$, at least about 500 s$^{-1}$, at least about 600 s$^{-1}$, at least about 700 s$^{-1}$, at least about 800 s$^{-1}$, at least about 900 s$^{-1}$, or up to about 1000 s$^{-1}$. As used herein, "shear degradation" refers to permanent degradation or breaking or scission of the polymer chain in the aqueous injection fluid. In particular, the aqueous injection fluids described herein advantageously may have substantially no shear degradation at a shear rate up to about 1000 s$^{-1}$.

EXAMPLES

Example 1—Sphere-to-Rod Transition of Surfactant Micelles

Figure 1:
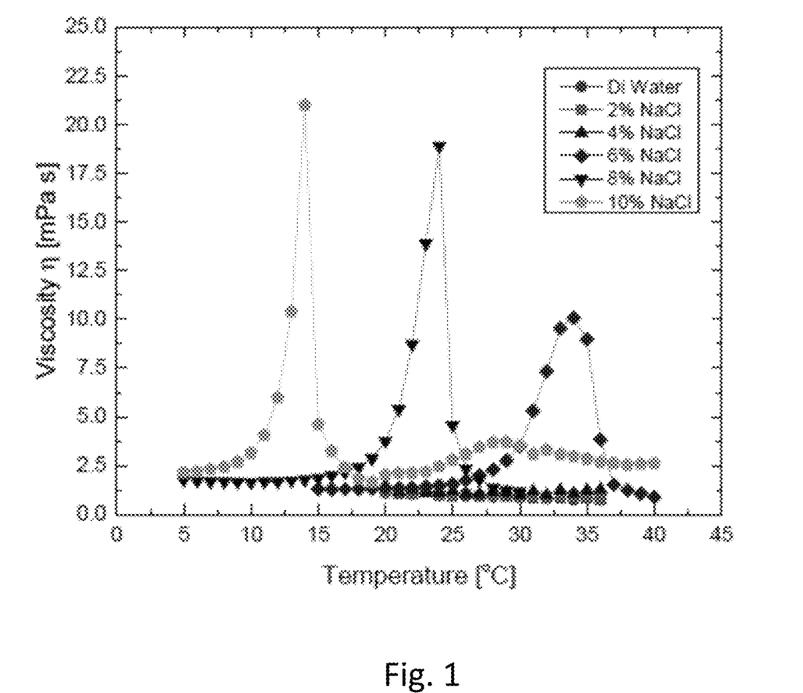
FIG. 1 illustrates viscosity vs. temperature plots for a 1:1 mixture of 1% 7P5E/7P3E in deionized water.

FIG. 1 shows the viscosity of a 1:1 mixture of 1% 7P5E/7P3E in deionized (DI) water as a function of temperature T measured at a shear rate of 1 s$^{-1}$. The various curves represent different concentrations of NaCl. For NaCl concentrations of 4 wt. % and below, the viscosity of the surfactant solutions is nearly identical to that of DI water-brine solutions, and is only a weak function of temperature in the range measured (5° C. to 40° C.). This temperature dependence is well modeled using an Arrhenius like equation, where the relaxation time $\lambda=\exp(-\Delta E/RT)$, E being energy, R being the gas constant, and T being temperature. This shows that the surfactant solution behaves like a simple viscous liquid whose viscosity changes exponentially with temperature. However, for salt concentrations of 6% and higher, a pronounced peak is visible in the viscosity vs. temperature data. As the salt concentration is increased, this peak is shifted to lower temperatures, and the magnitude of the peak increases.

Figure 2A:
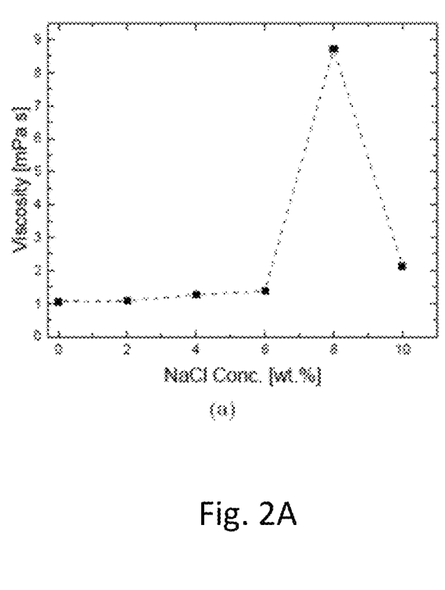
FIG. 2A illustrates a plot of salt concentration vs. viscosity for a 1% surfactant mixture with 8% NaCl at a fixed temperature of 22° C.

FIG. 2A plots viscosity as a function of salt concentration for a 1 wt % surfactant mixture (1:1 7P3E/7P5E) with 8 wt % NaCl at a fixed temperature of T=22° C. At low salt concentrations, viscosity is identical to that of a brine solution because as it lies in the region to the left of the peak. As salt concentration is increased while holding the temperature constant, the viscosity passes through a peak. Therefore, FIG. 2A looks qualitatively similar to the FIG. 1. This equivalence between salt and temperature to control solution viscosity is best described in FIG. 2B, which plots a representative color-map of the magnitude of the viscosity against salt and temperature, to illustrate the interplay between temperature and salt.

Figure 2B:
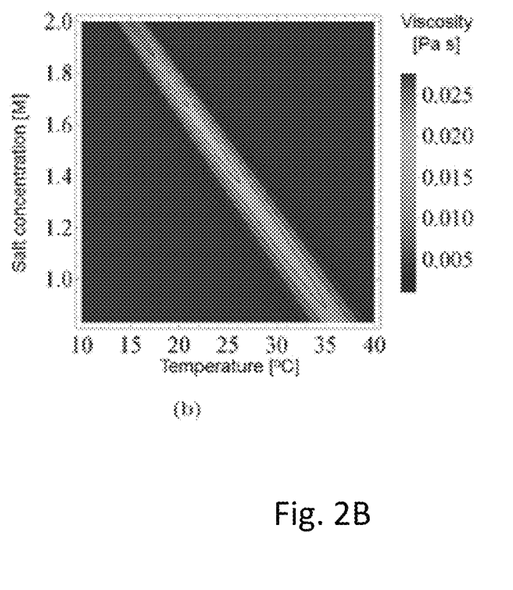
FIG. 2B illustrates a map for viscosity vs. temperature vs. salt concentration.

Depending on the surfactant chemistry, each surfactant of the PO-EO type has its own salt-temperature phase map. Therefore, such a diagram helps choose a surfactant chemistry based on the specific reservoir conditions (i.e., choose a surfactant formulation whose peak location coincides with the reservoir conditions).

Figure 3:
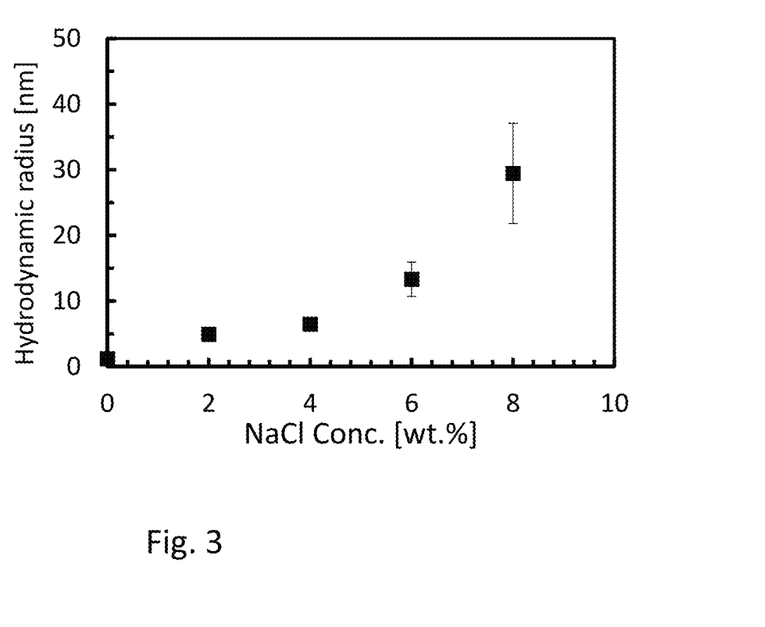
FIG. 3 illustrates the hydrodynamic radius as a function of NaCl concentration for a 1:1 mixture of 7P5E-7P3E surfactants at 1 wt % concentration in water.

Without being bound by theory, the increase in viscosity observed upon increasing the salt concentration or temperature is attributed to the transition of surfactant micelles from spheres to elongated structures such as cylinders and worm-like micelles. This transition was verified through Dynamic Light Scattering (DLS) and cryogenic Transmission Electron Microscopy (cryo-TEM) experiments. FIG. 3 illustrates the hydrodynamic radius as a function of NaCl concentration obtained by fitting the correlation function of the intensity of scattered light from DLS to a single exponential decay for a 1:1 mixture of 7P5E-7P3E surfactants at 1 wt % concentration in water. The hydrodynamic radius increases with increases in the NaCl concentration. The correlation function is well fitted by a single exponential decay for NaCl concentrations up to 4 wt %, indicating the presence of spherical micelles. However, the large error bars for NaCl concentrations of 6 wt % and 8 wt % indicate that the correlation function does not follow a single exponential decay. This is suggestive of elongated, cylindrical or worm-like micelle structures.

Figure 4:
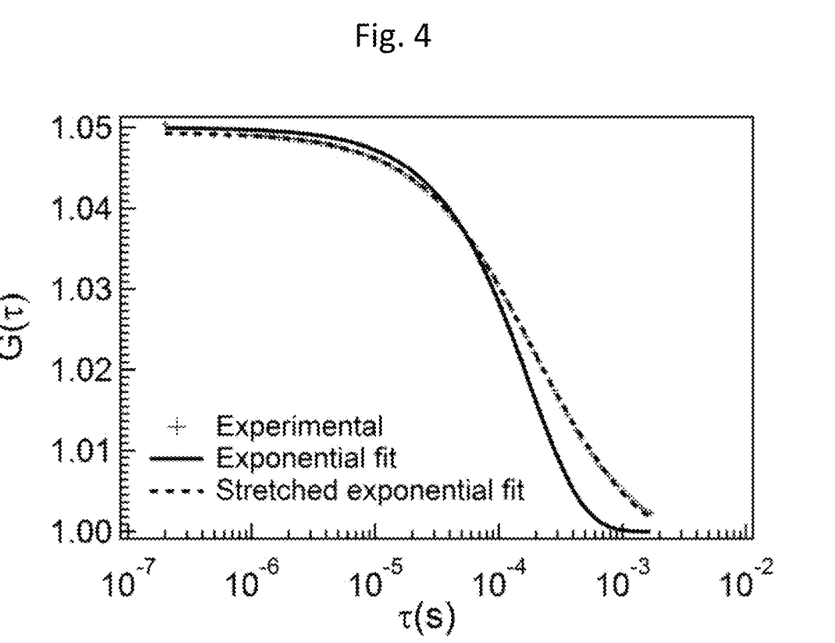
FIG. 4 illustrates a correlation function of the intensity of scattered light as a function of time for a 1 wt % aqueous solution of 1:1 weight ratio of 7P5E and 7P3E surfactants in water at 8 wt % NaCl concentration.

FIG. 4 illustrates the correlation function of the intensity of scattered light, G($\tau$) as a function of time $\tau$, for the 1 wt % aqueous solution of 1:1 weight ratio of 7P5E and 7P3E surfactants in water at 8 w % NaCl concentration. The correlation function is fitted well by a stretched exponential decay, which indicates the formation of wormlike micelles.

Figure 5:
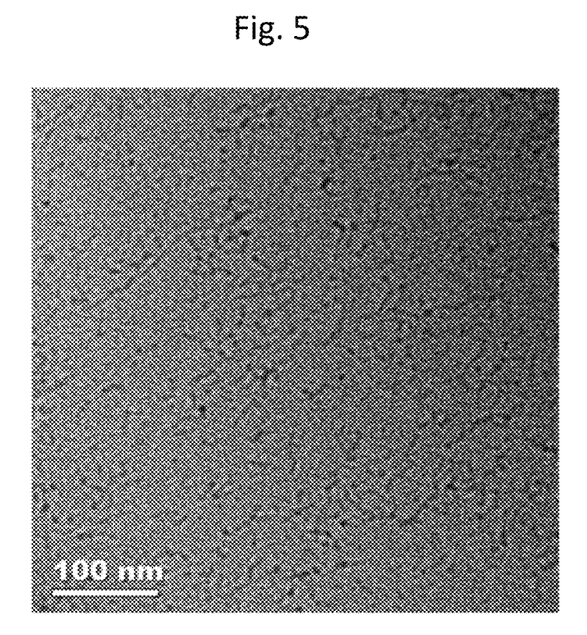
FIG. 5 illustrates a cryo-TEM image of the 1 wt % aqueous solution of 1:1 weight ratio of 7P5E and 7P3E surfactant in water at 6 wt % NaCl concentration.
Figure 6:
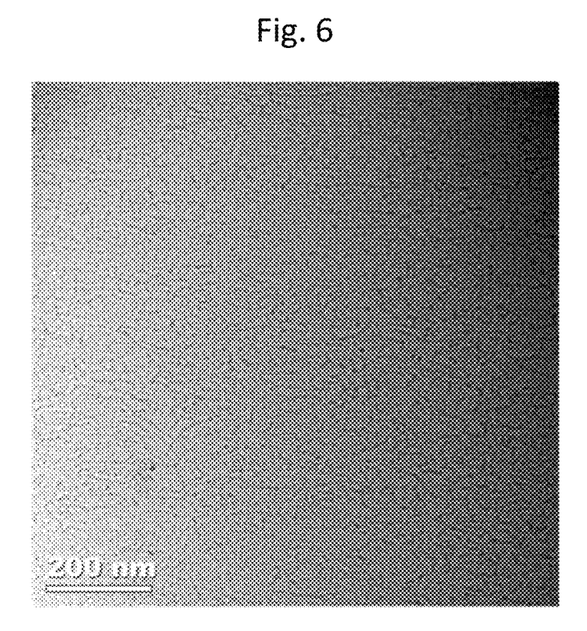
FIG. 6 illustrates a cryo-TEM image of the 1 wt % aqueous solution of 1:1 weight ratio of 7P5E and 7P3E surfactant in water at 8 wt % NaCl concentration.

The wormlike micelle structures were directly observed in cryo-TEM images. FIGS. 5 and 6 illustrate cryo-TEM images of the 1 wt % aqueous solution of 1:1 weight ratio of 7P5E and 7P3E surfactants in water at 6 wt % and 8 wt % NaCl concentrations, respectively. The measured length of micelles was typically less than 100 nm at 6 wt % NaCl concentration, and typically 100-240 nm at 8 wt % NaCl concentration. The entanglement of these wormlike micelles causes an increase in viscosity of the solution.

Example 2—Effect of Surfactant Concentration

Figure 7:
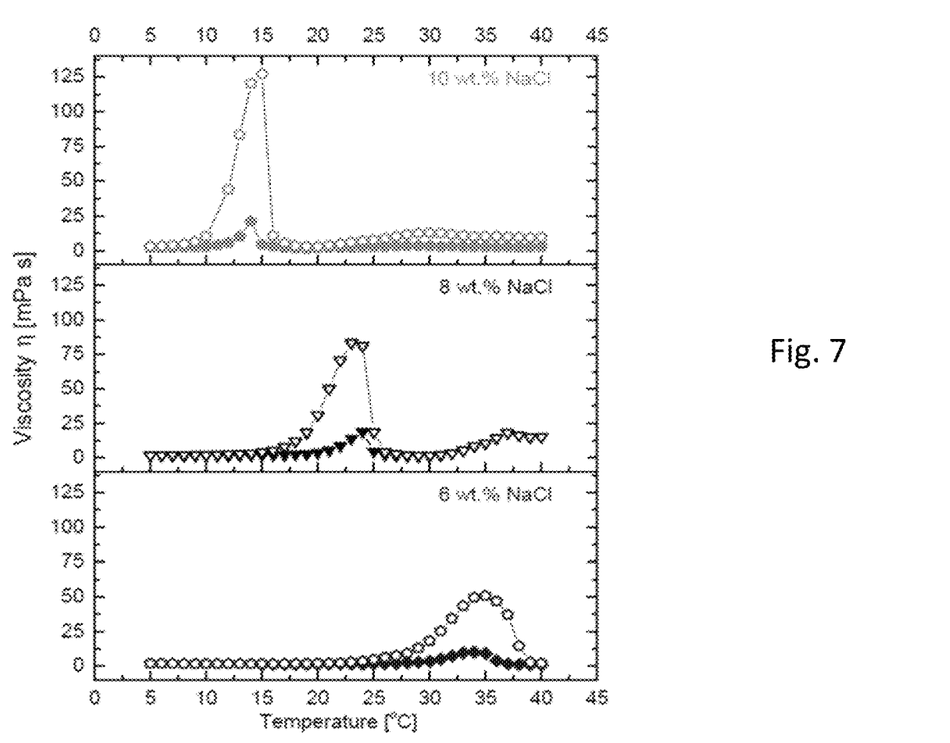
FIG. 7 illustrates plots of temperature vs. viscosity for a 1 wt % and 2 wt % surfactant concentration with different concentrations of NaCl.

Relying on just temperature and salinity to achieve a desired viscosity limits the magnitude of the viscosity obtained. FIG. 7 illustrates the influence of surfactant concentration on viscosity vs. temperature data for 2 wt % surfactant mixture solutions (1:1 mixture of 7P5E/7P3E) with different concentrations of added salt. It can be observed from these data that the location of the peak is not a strong function of the surfactant concentration, for the range of surfactant concentration tested. However, the magnitude of viscosity at the peak is an order of magnitude higher for the 2 wt % solution compared to the 1% solution. Therefore, FIG. 7 suggests that surfactant concentration is yet another parameter to tune viscosity. From the point of view of using the least amount of material for viscosification—which would be less expensive—it would be advantageous to operate near the peak temperature-salinity conditions. The surfactant chemistry can be varied so that the location of the peak lies close to the reservoir conditions, and the magnitude of the viscosity desired can be controlled with surfactant concentration.

Example 3—Effect of Surfactant Chemistry

Figure 8:
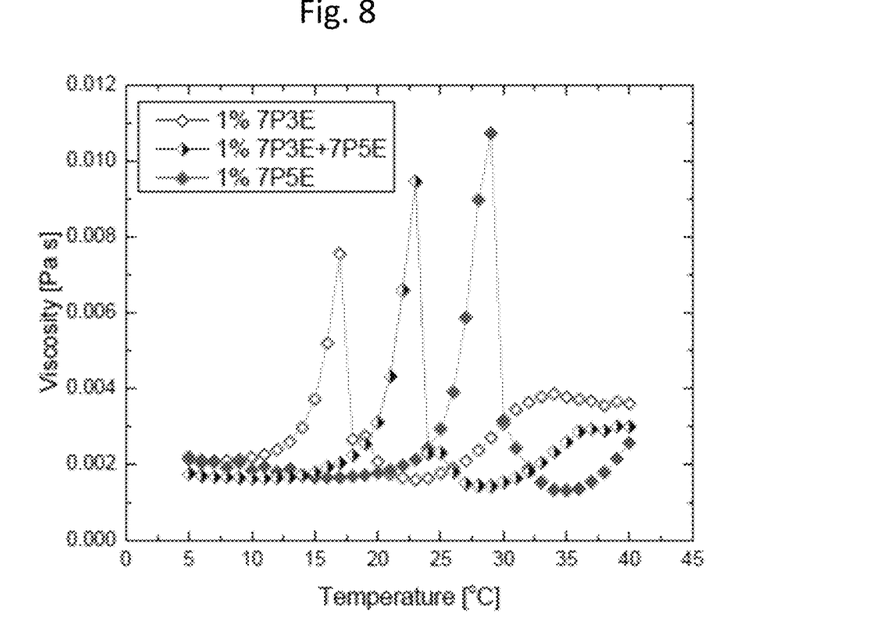
FIG. 8 illustrates plots of temperature vs. viscosity for pure surfactant components and a surfactant mixture.

FIG. 8 illustrates viscosity-temperature sweeps of the pure surfactant components (1 wt % 7P3E and 1 wt % 7P5E) along with the data for the 1% total surfactant mixture (7P5E/7P3E) shown previously. All three solutions contain 0.69 M $CaCl_2$. The temperature at peak viscosity $T_p$ of the pure 7P5E solution is higher than that of the pure 7P3E solution and the 1:1 mixture of 7P3E/7P5E. Without being bound by theory, this is in agreement with the solubility hypothesis; the existence of the extra EO (ethylene oxide) groups in 7P5E compared to 7P3E makes it more water soluble and hence $T_p$ is higher. Interestingly, the variation of viscosity with temperature of the mixture of 7P3E and 7P5E is not simply the additive sum of the variation of the individual components. The solution does not exhibit two independent peaks corresponding to each of 7P3E and 7P5E; instead, there is a single peak lying identically halfway between them. This is consistent with the solution being comprised of mixed micelles of 7P3E and 7P5E. Moreover, the peak viscosity temperature of the mixture $T_p$=23° C. is identical to the arithmetic mean of the individual peak viscosity temperatures of 7P3E and 7P5E, $T_p$=17° C. and $T_p$=29° C. respectively. This is an important finding because it demonstrates that the 1:1 mixture of 7P3E/7P5E behaves like a pure solution of 7P4E with respect to the peak viscosity temperature. The mixture forms mixed micelles, rather than micelles all consisting of one or the other surfactant type.

Example 4—Synergetic Effect Between HM Polymers and Rod-Like Cylindrical Surfactants The morphology of surfactant micelles is a function of temperature and salinity. SDS (sodium dodecyl sulfate) micelles undergo a sphere-to-rod transition on increasing the concentration of certain salts. Pluronic type triblock copolymer surfactants exhibit the same transition with increasing temperature. Pluronics are block copolymers consisting of hydrophilic ethylene oxide and hydrophobic propylene oxide blocks. Each type of pluronic differs either in the molar ratio of propylene oxide to ethylene oxide in the surfactant molecules, or the molecular weight of the entire block copolymer, or both. These are commercially available products. The examples above show that alkyl propoxylated-ethoxylated sulfate surfactants also exhibit morphology changes with increasing temperature and salinity. In the presence of HM polymers, changes in the morphology of the micelles changes the viscoelastic properties of the polymer-micelle system. Therefore, temperature and salinity can be used as tuning knobs for controlling the viscosity of the solution. Table 1 shows the viscosity of mixtures of 0.5 wt. % HMHEC (hydroxyethylcellulose) with the surfactant (1 wt. % 1:1 7P3E/7P5E) comprising ethylene oxide (EO) and propylene oxide (PO) groups flanked by an C13 alkyl tail on one end and a sulfate headgroup on the other. As the micellar length increases with increasing salt concentration from 4% to 5%, the viscosity increases by an order of magnitude. Increasing the concentration of polymer by just 0.1% causes another order of magnitude increase in viscosity. Note the low polymer concentrations required in this formulation to increase the viscosity by three orders of magnitude over the solvent. These results evidence the usefulness of the present technological advancement for in-situ injection fluid formulations. Because reservoir conditions are often very different from surface conditions in terms of salinity and temperature, an injection fluid formulation can be designed such that the viscosity at surface conditions is low, and hence easier to pump. When the formulation encounters the reservoir, micelles lengthen, interactions with the HM polymers increase, viscosity increases, and sweep efficiency increases.

TABLE 1

| Polymer concentration | NaCl concentration | Viscosity |
| --- | --- | --- |
| 0.1% | 4% | 14.6 mPa s |
| 0.1% | 5% | 228 mPa s |
| 0.2% | 6% | 1200 mPa s |

CONCLUSION

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

The invention claimed is:

1. A method for recovering oil from an oil reservoir, wherein the method comprises:
    forcing oil into a producing well by introducing an aqueous injection fluid into the oil reservoir for recovering oil from the oil reservoir, wherein the aqueous injection fluid includes, a polymer having a weight average molecular weight of about 10,000 g/mol to about 25,000 g/mol, the polymer comprising hydrophilic moieties selected from the group consisting of an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acids, a diallyl ammonium compound, a vinyl heterocyclic amide, a vinylaryl sulfonate, hydrolyzed acrylamide, non-hydrolyzed acrylamide, ethylene oxide, a monosaccharide, a urethane, and a combination thereof and a plurality of hydrophobic groups selected from the group consisting of an aralkyl, an alkylphenol, a haloalkyl, a quaternary ammonium halide, and a combination thereof, and a surfactant that changes shape within the oil reservoir based on salinity and/or temperature of the oil reservoir, wherein the surfactant is selected from the group consisting of alkylated propylene oxide ethylene oxide sulfates, sodium dodecyl sulfate, pluronic type triblock copolymer surfactants, and a combination thereof.

2. The method of claim 1, further comprising:
injecting the aqueous injection fluid into the oil reservoir, wherein the aqueous injection fluid has a first viscosity at a point of injection, and wherein the aqueous injection fluid adaptively increases in viscosity to a second viscosity as the aqueous injection fluid encounters the oil reservoir.

3. The method of claim 1, wherein the surfactant undergoes a sphere-to-rod transition based on salinity and/or temperature.

4. The method of claim 1, wherein the polymer is present in an amount of about 0.05 wt % to about 2.0 wt %, and the surfactant is present in an amount of about 0.05 wt % to about 2.0 wt %.

5. The method of claim 1, wherein the surfactant is alkylated propylene oxide ethylene oxide sulfate or a combination comprising alkylated propylene oxide ethylene oxide sulfate.

6. The method of claim 1, wherein the plurality of hydrophobic groups is aralkyl or a combination comprising aralkyl.

7. The method of claim 6, wherein aralkyl is selected from the group consisting of phenylmethyl, phenylethyl, phenylpropyl, phenylbutyl, phenylpentyl, naphthylmethyl, and a combination thereof.

8. The method of claim 1, wherein the plurality of hydrophobic groups is alkylphenol or a combination comprising alkylphenol.

9. The method of claim 8, wherein alkylphenol is selected from the group consisting of methylphenol, ethylphenol, propylphenol, butylphenol, amylphenol, heptylphenol, octylphenol, nonylphenol, dodecylphenol, and a combination thereof.

10. The method of claim 1, wherein the plurality of hydrophobic groups is haloalkyl or a combination comprising haloalkyl.

11. The method of claim 10, wherein haloalkyl is selected from the group consisting of chloromethyl, chloropropyl, chlorobutyl, fluoromethyl, fluoropropyl, fluorobutyl, fluorobromomethyl, trifluoromethyl, difluoromethyl, dichloromethyl, 2-chloro-2-fluoroethyl, 6,6,6-trichlorohexyl, and a combination thereof.

12. The method of claim 1, wherein the plurality of hydrophobic groups is quaternary ammonium halide or a combination comprising quaternary ammonium halide.

13. The method of claim 12, wherein quaternary ammonium halide is selected from the group consisting of benzalkonium chloride, benzethonium chloride, methylbenzethonium chloride, cetalkonium chloride, cetylpyridinium chloride, cetrimonium chloride, cetrimonium bromide, cetrimide, dofanium chloride, tetraethylammonium bromide, didecyldimethylammonium chloride, domiphen bromide, and a combination thereof.

14. The method of claim 1, wherein the aqueous injection fluid comprises:
about 0.07 wt % to about 0.8 wt % of the polymer; and
about 0.07 wt % to about 0.8 wt % of the surfactant.

15. A method for recovering oil from an oil reservoir, wherein the method comprises:
introducing an aqueous injection fluid into an oil reservoir, wherein the aqueous injection fluid comprises:
a polymer having a weight average molecular weight of about 10,000 g/mol to about 25,000 g/mol, the polymer comprising hydrophilic moieties selected from the group consisting of an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acids, a diallyl ammonium compound, a vinyl heterocyclic amide, a vinylaryl sulfonate, a hydrolyzed acrylamide, a non-hydrolyzed acrylamide, an ethylene oxide, a monosaccharide, a urethane, and a combination thereof and a plurality of hydrophobic groups selected from the group consisting of aralkyl, alkylphenol, haloalkyl, quaternary ammonium halide, and a combination thereof, and
a surfactant selected from the group consisting of alkylated propylene oxide ethylene oxide sulfate, sodium dodecyl sulfate, pluronic type triblock copolymer surfactants, and a combination thereof.

\* \* \* \* \*